United States Patent
Yeung et al.

(10) Patent No.: US 10,360,704 B2
(45) Date of Patent: Jul. 23, 2019

(54) TECHNIQUES FOR PROVIDING DYNAMIC MULTI-LAYER RENDERING IN GRAPHICS PROCESSING

(71) Applicant: Microsoft Technology Licensing, LLC, Redmond, WA (US)

(72) Inventors: Andrew Zicheng Yeung, Seattle, WA (US); Jack Andrew Elliott, Seattle, WA (US); Brent Michael Wilson, Kirkland, WA (US); Michael George Boulton, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/675,293

(22) Filed: Aug. 11, 2017

(65) Prior Publication Data
US 2019/0051026 A1    Feb. 14, 2019

(51) Int. Cl.
*G06T 11/40* (2006.01)
*G06T 1/20* (2006.01)
*G06T 15/00* (2011.01)

(52) U.S. Cl.
CPC ............. *G06T 11/40* (2013.01); *G06T 1/20* (2013.01); *G06T 15/005* (2013.01); *G06T 2210/08* (2013.01)

(58) Field of Classification Search
None
See application file for complete search history.

(56) References Cited

U.S. PATENT DOCUMENTS

| | | | |
|---|---|---|---|
| 6,008,820 A | 12/1999 | Chauvin et al. | |
| 6,016,150 A * | 1/2000 | Lengyel | G06T 11/001 345/426 |
| 6,266,068 B1 | 7/2001 | Kang et al. | |
| 7,417,646 B1 | 8/2008 | Larsen | |
| 7,792,876 B2 | 9/2010 | Easwar | |
| 8,566,736 B1 | 10/2013 | Jacob et al. | |
| 8,773,435 B2 | 7/2014 | Falco | |
| 9,241,128 B2 | 1/2016 | Butterworth et al. | |
| 2015/0228046 A1 | 8/2015 | Uppinkere et al. | |
| 2016/0358305 A1 | 12/2016 | Banerjee et al. | |
| 2018/0081429 A1 * | 3/2018 | Akenine-Moller | G06F 3/011 |

(Continued)

OTHER PUBLICATIONS

Chow, Yang-Wai, Ronald Pose, and Matthew Regan. "Region warping in a virtual reality system with priority rendering." IADIS AC. 2005.*

(Continued)

*Primary Examiner* — Ryan M Gray
(74) *Attorney, Agent, or Firm* — Arent Fox LLP

(57) ABSTRACT

Examples described herein generally relate to rendering graphics in a computing device. A processing over-budget condition related to rendering a frame can be detected, based on which a value of a rendering parameter for a layer, where the layer is one of multiple layers to render for the frame can be modified. The layer can be rendered based at least in part on the value of the rendering parameter while one or more other layers of the multiple layers can be rendered based on respective values for the rendering parameter. The value of the rendering parameter for the layer can be different from at least one of the respective values of the rendering parameter for the one or more other layers.

20 Claims, 5 Drawing Sheets

(56) References Cited

U.S. PATENT DOCUMENTS

2018/0115743 A1* 4/2018 McLoughlin .......... H04N 21/20
2018/0190006 A1* 7/2018 Overbeck ............... G06T 15/06

OTHER PUBLICATIONS

Regan, Matthew, and Ronald Pose. "Priority rendering with a virtual reality address recalculation pipeline." Proceedings of the 21st annual conference on Computer graphics and interactive techniques. ACM, 1994.*

Kang, et al., "Multi-layered Image-Based Rendering", In Graphics Interface, Sep. 1, 1999, 9 pages.

Jeschke, et al., "Image-based representations for accelerated rendering of complex scenes", Published In Eurographics 2005 State of the Art Reports, Jan. 1, 2005, 20 Pages.

"International Search Report and Written Opinion Issued in PCT Application No. PCT/US2018/038381", dated Sep. 19, 2018, 16 Pages.

Torborg, J., et al., "Talisman: Commodity Realtime 3D Graphics for the PC", In Proceedings of the 23rd annual conference on Computer graphics and interactive techniques, 1996, 11 Pages.

Woohyun, Joo, et al., "Resource-constrained spatial multi-tasking for embedded GPU", IEEE International Conference On Consumer Electronics (ICCE). I, Jan. 10, 2014, 2 Pages.

* cited by examiner

TECHNIQUES FOR PROVIDING DYNAMIC MULTI-LAYER RENDERING IN GRAPHICS PROCESSING

BACKGROUND

Use of computing devices is becoming more ubiquitous by the day. Computing devices range from standard desktop computers to wearable computing technology and beyond. One area of computing devices that has grown in recent years are gaming devices and virtual reality (VR) devices, which rely on a graphics processing unit (GPU) to render graphics from a computing device to a display device based on rendering instructions received from the computing device. In gaming/VR devices, or in any computing device, an image to be produced on a display device can include multiple layers that may be separately rendered, such as a background layer, a scene layer, a user interface (UI) layer, a shadowing layer, etc. Depending on processor availability and complexity of the layers to be rendered, it is possible that processing during rendering exceeds a budget in terms of resources, time for rendering, etc., which can result in undesirable rendering effects, such as dropping frames, tearing of frames, and/or the like.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a method for rendering graphics in a computing device is provided. The method includes detecting a processing over-budget condition related to rendering a frame, modifying, based on detecting the processing over-budget condition, a value of a rendering parameter for a layer, where the layer is one of multiple layers to render for the frame, rendering the layer based at least in part on the value of the rendering parameter, and rendering one or more other layers of the multiple layers based on respective values for the rendering parameter, where the value of the rendering parameter for the layer is different from at least one of the respective values of the rendering parameter for the one or more other layers.

In another example, a computing device for rendering graphics is provided. The computing device includes a memory storing one or more parameters or instructions for executing an operating system and one or more applications, a display interface coupled with a display device for communicating signals to display rendered frames on the display device, and at least one processor coupled to the memory and the display interface. The at least one processor is configured to detect a processing over-budget condition related to rendering a frame, modify, based on detecting the processing over-budget condition, a value of a rendering parameter for a layer, where the layer is one of multiple layers to render for the frame, render the layer based at least in part on the value of the rendering parameter, and render one or more other layers of the multiple layers based on respective values for the rendering parameter, where the value of the rendering parameter for the layer is different from at least one of the respective values of the rendering parameter for the one or more other layers.

In another example, a non-transitory computer-readable medium, including code executable by one or more processors for rendering graphics in a computing device is provided. The code includes code for detecting a processing over-budget condition related to rendering a frame, modifying, based on detecting the processing over-budget condition, a value of a rendering parameter for a layer, where the layer is one of multiple layers to render for the frame, rendering the layer based at least in part on the value of the rendering parameter, and rendering one or more other layers of the multiple layers based on respective values for the rendering parameter, where the value of the rendering parameter for the layer is different from at least one of the respective values of the rendering parameter for the one or more other layers.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

Figure 1:
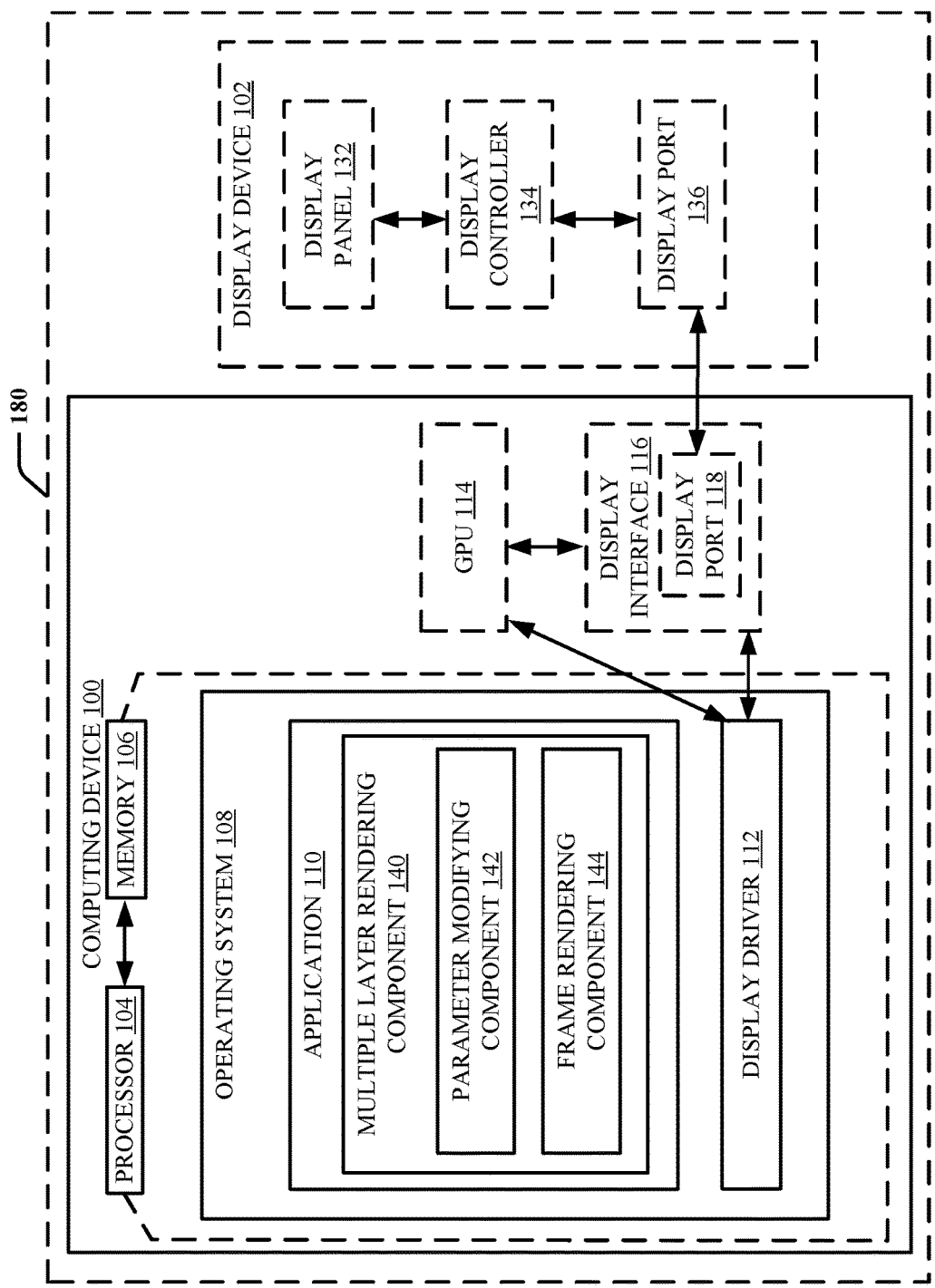
FIG. 1 is a schematic diagram of an example of a computing device and display device communicatively coupled for rendering images in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to providing dynamic multi-layer rendering in graphics processing where multiple layers of an image (also referred to herein as a "frame," such as a frame of a video) can be rendered using different values for one or more associated rendering parameters. In an example, the values can be modified differently (including not being modified at all for one or more layers), or at different rates, based on detecting a processing over-budget condition such to prioritize a quality associated with rendering certain layers over others. For example, a modification value to apply to a value of a rendering parameter for a user interface (UI) layer may be different from a modification value to apply to a value of the rendering parameter for a scene layer, as visibility of the UI may be prioritized over visibility of the scene. Thus, for example, for a given detected processing over-budget condition, the value of the rendering parameter (e.g., resolution) for the UI layer may not be changed (e.g., reduced), while the value of the rendering parameter for the scene layer may be changed (e.g., reduced) in an attempt to lower processing of rendering the frame to within the budget. In another example, the value of the rendering parameter for the UI layer may be changed (e.g., reduced) to a lesser extent than that of the scene layer. The rendering parameter can include substantially any parameter that results in workload for rendering the layer, such as a resolution, an anti-aliasing parameter, a sampling rate for sampling pixels for the layer, an anisotropic filtering parameter, etc.

In a specific example, the rates of reducing or otherwise modifying the value of the rendering parameter can be specified in a priority profile for the given layer. For example, the priority profile can indicate, for multiple values of an over-budget parameters (e.g., a percentage over-budget of processing of the frame), a rate or an amount for changing (e.g., reducing) the rendering parameter of the layer so as to reduce or eliminate the over-budget condition. Thus, based on a determined percentage over-budget of processing a frame (e.g., of processing a previous frame as obtained from a feedback loop, or processing a current frame as received from a prediction of processing requirements, etc.), an amount of change (e.g., reduction) for the value of the rendering parameter at each of the multiple layers can be determined based on the respective priority profile. In an example, information regarding performing of the rendering using the different values can be provided for use in performing a subsequent rendering for the layer(s) in a subsequent frame.

Figure 2:
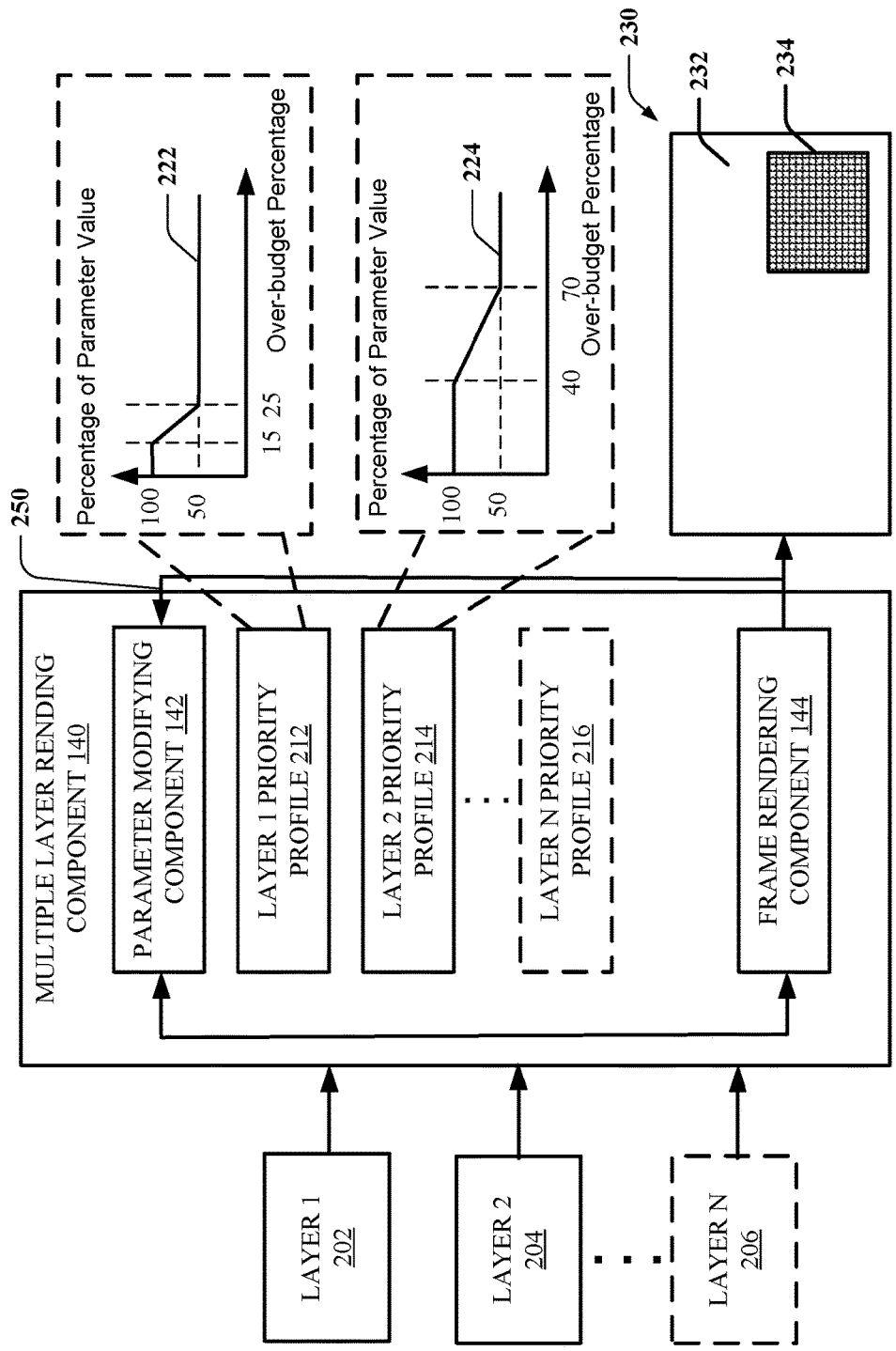
FIG. 2 is a schematic diagram of an example of a multiple layer rendering component for rendering an image having multiple layers in accordance with examples described herein.
Figure 3:
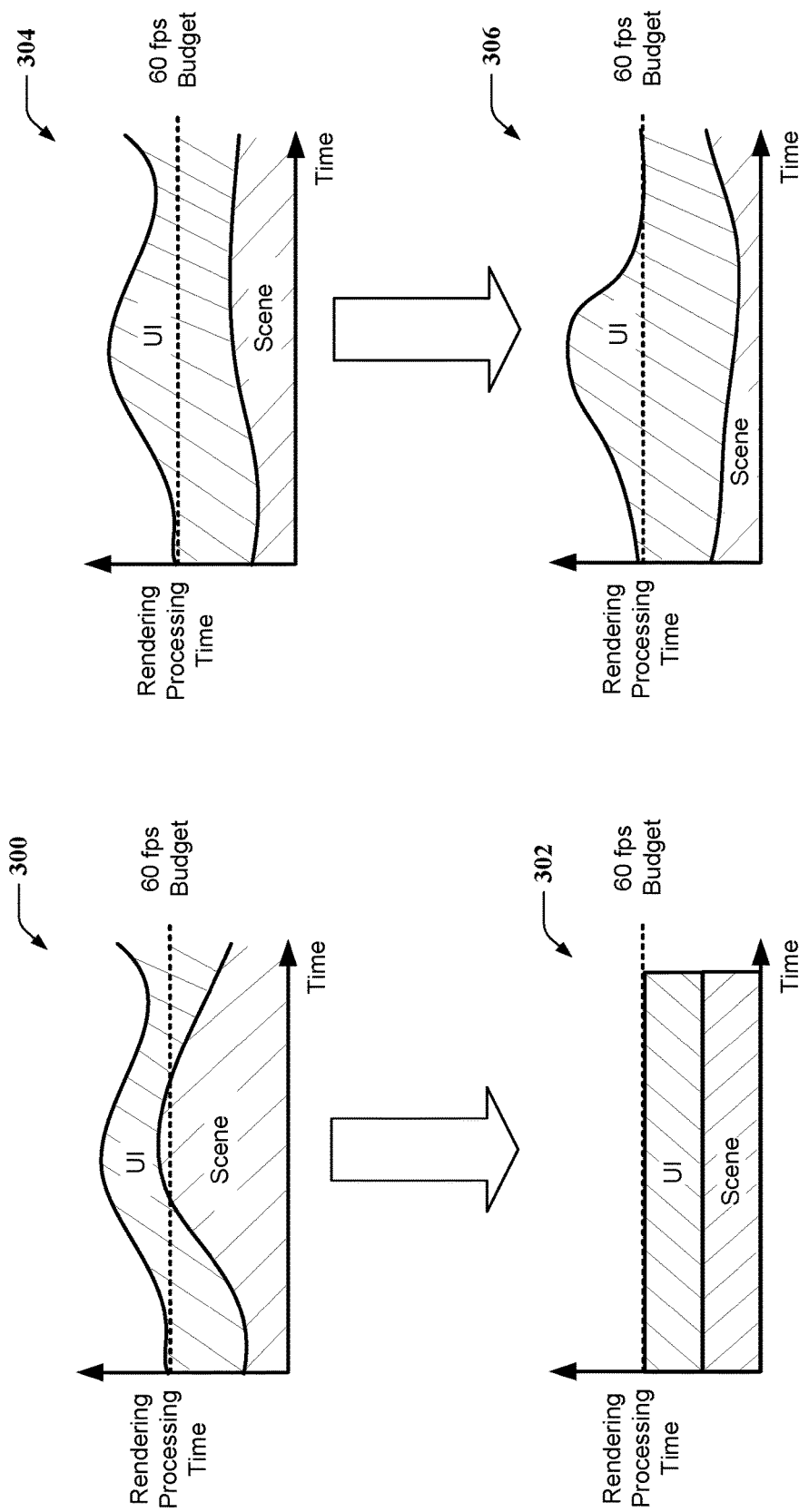
FIG. 3 illustrates graphs indicating examples of rendering processing times for rendering multiple layers of frames over a period of time.

Turning now to FIGS. 1-4, examples are depicted with reference to one or more components and one or more methods that may perform the actions or operations described herein, where components and/or actions/operations in dashed line may be optional. Although the operations described below in FIG. 3 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIGS. 1 and 2 are schematic diagrams of examples of a computing device 100, display device 102, and/or related components, which can communicate image data for displaying images on the display device 102, and/or on other devices. For example, the display device 102 may be an internal display that is within the same housing 180 as computing device 100, a display device that is external to computing device 100 (e.g., and coupled to computing device 100 via a display port, a wired or wireless network connection, etc.), and/or the like. Display device 102 can be capable of displaying a two-dimensional display, such as a desktop, a three-dimensional world, etc.

For example, computing device 100 can include or can otherwise be coupled with a processor 104 and/or memory 106, where the processor 104 and/or memory 106 can be configured to execute or store instructions or other parameters related to communicating image data to the display device 102 for rendering, as described herein. Computing device 100 can execute an operating system 108 (e.g., via processor 104 and/or memory 106) for providing an environment for executing one or more applications 110, such as one or more applications 110 that produce or otherwise obtain images for display by the display device 102. For example, the computing device 100 can include a VR device, and additionally, the one or more applications 110 can be one or more VR applications operable to cause the generation of VR images on the display device 102 of the VR device. The operating system 108 can also include a display driver 112 for communicating with a GPU 114 and/or with a display interface 116 of the computing device 100 (e.g., directly or via GPU 114) to cause rendering of one or more images for display on the display device 102.

In an example, display interface 116 can be communicatively coupled with the processor 104 and/or memory 106 for communicating with the display device 102 via a display port 118. Display port 118, as referred to herein, can include one or more of various types of ports, including a high definition multimedia interface (HDMI) port, a display serial interface (DSI) port, a mobile industry processor interface (MIPI) DSI port, a universal serial bus (USB) port, a Firewire port, or other embedded or external wired or wireless display ports that can allow communications between computing device 100 and display device 102.

For example, display device 102 can include a display panel 132 for displaying one or more images based on signals received from a display controller 134. For example, the display panel 132 can include a liquid crystal display (LCD) (which can include a light emitting diode (LED) backlit LCD display), organic LED (OLED) display, digital light processing (DLP) display, etc. Display device 102 can include, but is not limited to, a head-mounted display having a single display panel or multiple display panels (e.g., one for each of two eyes) to view on the head-mounted display, a monitor, a television, a projector, or substantially any type of embedded, external, wireless, etc., display configured for communicating with computing device 100 via an embedded, external, or wireless display port 136. As mentioned, display controller 134 provides signals to the display panel 132 to cause display of images. In an example, display controller 134 can include a printed circuit board (PCB), programmable logic controller (PLC), etc., coupled with the display panel 132 to control the display panel 132 to display images based on commands received via display port 136. Thus, for example, display controller 134 can be or can include a processor configured for sending the signals to the display panel 132 based on image data (e.g., rendered image frames) received via display port 136.

In an example, computing device 100 can generate image data for providing to the display device 102 for displaying one or more images on display panel 132. Computing device 100 can accordingly communicate the image data to the display device 102 via display interface 116 using display port 118 to communicate signals corresponding to the image data to display port 136 for providing to display controller 134. In an example, operating system 108 and/or application 110 can obtain or otherwise generate images for displaying on display device 102, and display driver 112 can provide rendering instructions for rendering the images to GPU 114 (e.g., via display interface 116 or otherwise). In one example, GPU 114 can be part of the display interface 116 (e.g., a processor on a circuit board of the display interface 116). In another example, GPU 114, display interface 116, etc., can be integrated with processor 104. Substantially any combination of hardware can be possible such that GPU 114, display interface 116, etc., can communicate with processor 104 via a bus to facilitate providing the rendering instructions from the display driver 112 executing on the processor 104 (e.g., via the operating system 108) to the GPU 114. GPU 114 can process the rendering instructions to render an image, and can initiate display of at least a portion of the image on the display device 102 by transmitting associated signals to the display device 102 via display port 118 of display interface 116. The display device 102 can receive the signals generated by the GPU 114, and display controller 134 can accordingly cause display panel 132 to draw or display the image based on the signals.

The application 110 can function to display images on the display device 102 in a virtual reality or other first-person environment, for example. In this regard, the application 110 (and/or operating system 108) can include a multiple layer rendering component 140 for rendering images having multiple layers for display on display device 102. In this example, the images to display can be generated by the application 110 and/or operating system 108 for display on the display device 102 and can have multiple layers, such as but not limited to a scene layer (e.g., a graphical scene of a game or other multimedia experience), a UI layer, which can include information about the scene layer or the game or anything else relevant to the application 110, a shadowing layer, etc. In this example, multiple layer rendering component 140 can render each layer in generating a final image output of a frame for display via display device 102. In an example, multiple layer rendering component 140 can render the layers on top of one another and/or according to another mechanism for joining or combining the layers. As described further herein, multiple layer rendering component 140 can render the layers using different values for one or more rendering parameters, which can allow for associating a priority to each layer for prioritizing a quality of rendering the layers or for achieving the rendering of the final image within a given budget.

For example, multiple layer rendering component 140 can include a parameter modifying component 142 for modifying a value of one or more rendering parameters related to a layer of an image, and a frame rendering component 144 for rendering the multiple layers to produce the image (i.e., frame). For example, the rendering parameter can correspond to substantially any parameter that can affect processing budget used in rendering a given layer, such as, but not limited to, a resolution for the layer, an anti-aliasing parameter (e.g., a multisample anti-aliasing (MSAA) parameter), a sampling rate for sampling pixels for the layer, an anisotropic filtering parameter, etc. Accordingly, parameter modifying component 142 can independently adjust a value for such a rendering parameter for each layer in the frame, e.g., based on a priority profile for the given layer, to save processing resources in an attempt to not exceed the processing budget. Frame rendering component 144 can render each layer of the frame according to the adjusted values for the rendering parameter(s), and can provide associated rendering instructions to the GPU 114 to render the layers of the frame.

FIG. 2 illustrates an example of the multiple layer rendering component 140, which includes parameter modifying component 142 and frame rendering component 144 for rendering one or more layers 202, 204, 206 of an image. Multiple layer rendering component 140, in this example, can also include one or more priority profiles 212, 214, 216 that define respective functions or curves for adjusting a value of a rendering parameter (e.g., Percentage of Parameter Value on the vertical axis) based on an amount that the rendering process is over-budget (e.g., Over-budget Percentage on the horizontal axis) for the one or more layers 202, 204, 206. As such, multiple layer rendering component 140 can independently and selectively vary rendering resources that are provided to render each layer of an image in an attempt to achieve or maintain a rendering budget.

For example, multiple layer rendering component 140 can receive multiple layers for rendering an image, such as layer 1 202, layer 2 204, and up to layer N 206, where N is a positive number, from an application 110, operating system 108, etc. In an example, each layer can correspond to a portion of the image, and the layers can be rendered separately, on top of one another, in an order specified by the application 110, operating system 108, etc. The layers can also be referred to as surfaces. For example, layer 1 202 can be a scene layer that depicts a scene of a game or other application, layer 2 204 can be a UI layer that depicts text, icons, etc. to form a UI related to the game or other application, a UI related to the operating system 108, etc. The image can have additional layers, such as a shadowing layer that adds shadowing effect to the scene layer, and/or the like. At least one of the one or more layers (and/or each of the layers) can have an associated layer priority profile, e.g., priority profiles 212, 214, 216 in this example, that defines at least one value for a rendering parameter (or a modification to such a value, such as a reduction in the value) as a function of a value related to processing for rendering the image (or a previous image). For example, the value related to processing for rendering the image may be feedback of rendering a previous image (e.g., feedback 250 received from frame rendering component 144, as described further herein), feed-forward information of predicting processing required for the current frame, etc. In any case, in this regard, parameter modifying component 142 can determine whether to adjust a value of the rendering parameter for a layer based on the value related to the processing for rendering the image and the priority profile associated with the given layer.

In a specific example, as depicted, a layer 1 priority profile 212 is provided for a parameter value related to rendering layer 1 202 for different values of a processing over-budget percentage. For example, the processing over-budget percentage can correspond to an amount of processing over-budget in rendering a previous frame, such as an actual number of milliseconds needed over a target number of milliseconds budgeted for rendering the previous frame. In this example, layer 1 priority profile 212 can indicate a percentage of a value 222 of the rendering parameter to use (indicated on the vertical axis) for the processing over-budget percentage. For instance, in this example, the value 222 of the rendering parameter to use can be 100% (e.g., rendering parameter value*1) until the processing over-budget percentage reaches 15%, at which point the value 222 to use can decrease. When the processing over-budget percentage reaches 25%, the value for the rendering parameter can be 50% (e.g., rendering parameter value*0.5). Similarly, for layer 2 priority profile 214, in this example, the value 224 can be 100% until the processing over-budget reaches 40%, at which point the value 224 decreases and reaches 50% when the percentage over-budget reaches 70%.

Thus, the first rate for reducing the value 222 as a function of the processing over-budget can be greater than the second rate of reducing the second value 224 at least for some values of processing over-budget, which can separately and independently vary rendering resources that are provided to render each layer of an image in an attempt to achieve or maintain a rendering budget.

In this example, where the over-processing percentage reaches 30%, the value of the rendering parameter for layer 1 can be 50% of the original or configured value (e.g., the value indicated by the application for rendering layer 1 202), whereas the value of the rendering parameter for layer 2 can still be 100% of the original or configured value (e.g., the value indicated by the application for rendering layer 2 204). Thus, rendering of layer 2 204 can be prioritized over rendering of layer 1 202 such to have improved resolution (or at least improved from the originally configured resolution for the layer) in many cases where processing has gone over budget. In a specific example, layer 1 202 can be a scene layer, layer 2 204 can be a UI layer, and the rendering parameter can be a resolution, and thus the UI layer can be kept at full resolution in the case of 30% over-budget processing, whereas the scene layer can be reduced to half resolution in an attempt to meet the processing budget (e.g., a time to render the entire frame) when rendering the frame.

The priority profiles 212, 214, 216 can be substantially any representation of the rendering parameter value as a function of the value of the processing of rendering the frame (or a previous frame)—e.g., the over-budget percentage, an actual processing time, a predicted processing time (of the current frame), etc. Thus, though shown as a graph, the priority profiles 212, 214, 216 can be a list of values (or range of values) of the rendering parameter (or percentages of the configured value) as mapped to values (or range of values) of the processing of rendering the frame, a list of functions for computing the values of the rendering parameter as mapped to values of the processing of rendering the frame, etc. In addition, for example, the graphs shown can be represented by a combination of such values (e.g., a fixed value of 100% mapped to 0-15% processing value, a function of 100% to 50% for 15-25% processing value, and a fixed value of 50% for over 25% processing value for layer 1 priority profile 212).

As described, the one or more rendering parameters whose value(s) may be adjusted by parameter modifying component 142 can include but is not limited to one or any combination of resolution, an anti-aliasing parameter, a sampling rate (e.g., vertex level of detail) for sampling pixels for the layer, an anisotropic filtering parameter. Thus, in some examples, the rendering parameter can have a limited number of possible values (and indeed can be a bit with 2 possible values). In this regard, for example, the priority profiles 212, 214, 216 can indicate an actual value for use in modifying the rendering parameter as a function of the value of processing of rendering the frame (e.g., whether anisotropic filtering is at all configured for the corresponding layer for a certain value or values of the processing over-budget percentage). Moreover, the priority profiles 212, 214, 216 can indicate values for multiple rendering parameters as a function of the value of the processing of rendering the frame (or previous frame), and/or there can be separate priority profiles for different rendering parameters for one or more of the layers.

Additionally, for example, the priority profiles 212, 214, 216 can be indicated by the application 110, operating system 108, etc., or otherwise configured at the multiple layer rendering component 140 to achieve appropriate value modification for rendering parameters in an attempt to stay within a processing budget for rendering frames while prioritizing rendering of certain layers over others. In any case, frame rendering component 144 can output frame 230 by independently rendering two or more of layer 1, 202, layer 2, 204, and up to layer N 206, such as the example frame 230 that in this case includes rendered layer 1 232 and rendered layer 2 234 (e.g., on top of layer 1 232).

As described further herein, frame rendering component 144 can provide feedback information 250 associated with the rendering of the frame 230 to parameter modifying component 142 for subsequently determining whether and/or how to modify the rendering parameter(s) of the layers 202, 204, 206 based on the associated priority profiles 212, 214, 216. Feedback information 250 may include the value of processing of rendering the frame, such as, but is not limited to, one or any combination of a percentage over-budget for processing rendering of the frame, an actual time for processing rendering of the frame, an actual time spent over the budgeted time for rendering the frame, a percentage or time under-budget, etc., and/or parameters from which parameter modifying component may derive or infer such information. In response to receiving feedback information 250, parameter modifying component 142 can use the feedback information 250, or information derived therefrom, to determine an adjustment or modification to one or more rendering parameters for one or more layers (e.g., layer 1 202, layer 2 204) for the next frame. Moreover, in an example, parameter modifying component 142 can be configured to modify other rendering parameters based on feedback from rendering based on adjusting a different rendering parameter (e.g., adjust resolution first and begin adjusting sampling level if processing is still over-budget).

FIG. 3 illustrates graphs indicating examples of rendering processing times for rendering multiple layers of frames over a period of time (e.g., over a number of frames). For example, as shown in graph 300, an application may start out rendering a UI and scene layer within a 60 frames per second (fps) budget. Subsequent frames, however, may introduce complexity into the scene that may require additional processing, and thus may cause rendering for the scene layer and the UI layer to exceed the 60 fps budget (e.g., cause the processing time for rendering the scene and UI layers to exceed the frametime (~16 ms) that allows for achieving a corresponding refresh rate (e.g., 60 hz or higher)). By utilizing the multiple layer render component 140 described herein, however, one or more rendering parameters related to at least the scene layer can be reduced in an attempt to stay within the 60 fps processing budget, as shown in graph 302. As described, this may include reducing a resolution for rendering the scene layer while keeping the resolution for the UI layer (or reducing to a lesser extent), which may be based on corresponding priority profiles, as described, and based on the rendering processing time of a previous frame (in a feedback scenario) or the current frame (in a feed-forward scenario).

As shown in graph 304, for example, the application may start out rendering a UI and scene layer within a 60 frames per second (fps) budget. Subsequent frames, however, may introduce complexity into the UI that may require additional processing, and thus may cause rendering for the scene layer and the UI layer to exceed the 60 fps budget. By utilizing the multiple layer render component 140 described herein, however, one or more rendering parameters related to at least the scene layer can be reduced in an attempt to stay within the 60 fps processing budget, as shown in graph 306. As described, and as shown in graph 306, this may include reducing a resolution for rendering the scene layer while attempting to keep the resolution for the UI layer. As shown, however, the reduction in scene layer resolution may not be enough to achieve the budget, and thus the UI layer resolution can start to be reduced as well (e.g., to a lesser extent or after first attempting to reduce the scene layer resolution). The extent to which to reduce the resolution can be based on corresponding priority profiles, as described, and based on the rendering processing time of a previous frame (in a feedback scenario) or the current frame (in a feed-forward scenario). Thus, it is possible, as shown in graphs 304 and 306, that the UI layer causes the increase in processing time, but rendering of the scene layer is actually impacted (or at least impacted initially and/or to a greater extent than the UI layer) in attempting to remain within the 60 fps processing budget.

Figure 4:
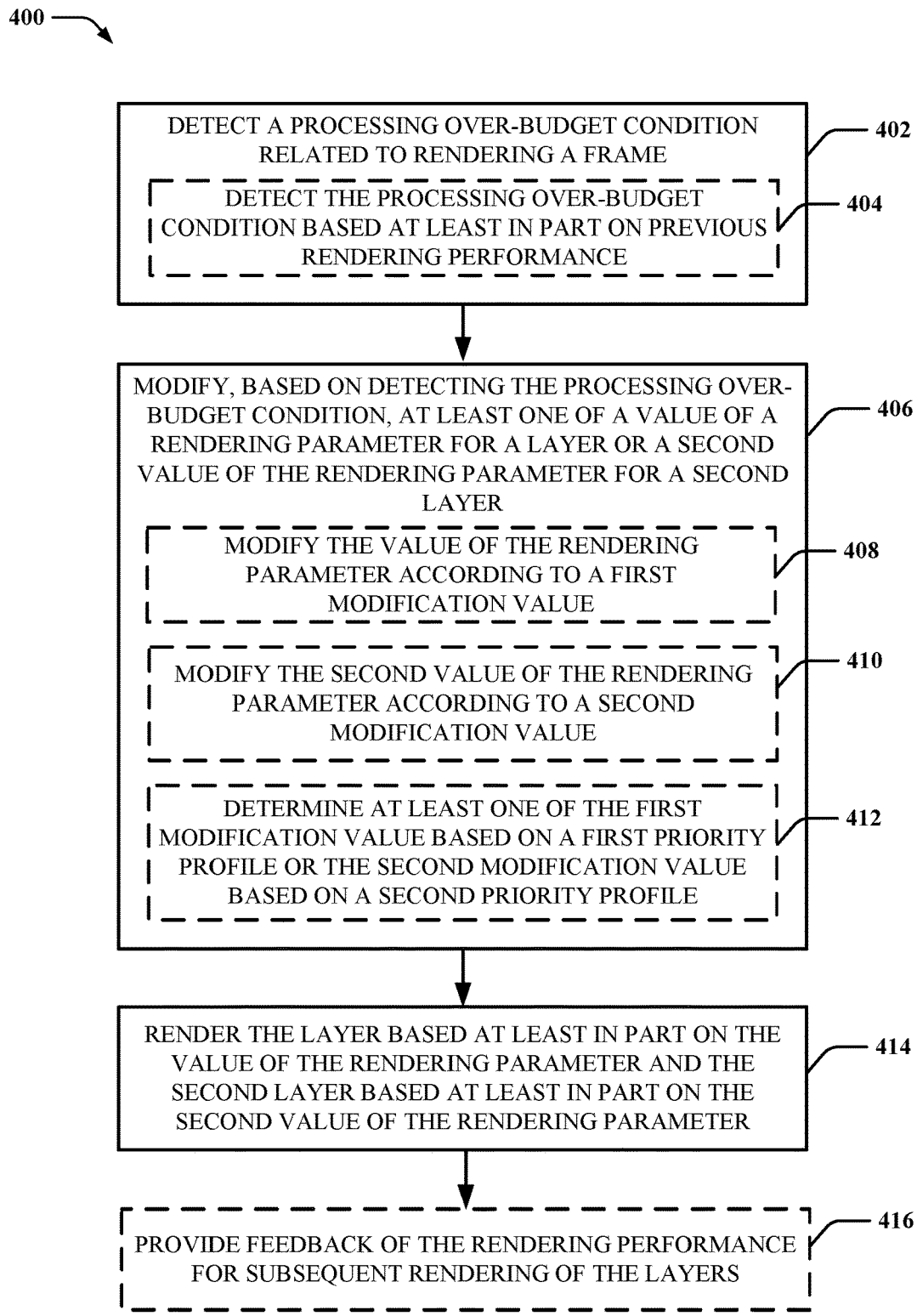
FIG. 4 is a flow diagram of an example of a method for rendering an image with multiple layers in accordance with examples described herein.

FIG. 4 is a flowchart of an example of a method 400 for rendering layers using different values, or different modifications of values, for one or more associated rendering parameters such that rendering resources can be prioritized for use with one layer over another when an over-budget rendering condition is determined. For example, method 400 can be performed by a computing device 100 and/or display device 102 communicatively coupled with one another, and is accordingly described with reference to FIGS. 1-2, for example.

In method 400, at action 402, a processing over-budget condition related to rendering a frame can be detected. In an example, parameter modifying component 142, e.g., in conjunction with processor 104, memory 106, multiple layer rendering component 140, etc., can detect the processing over-budget condition related to rendering the frame. For example, parameter modifying component 142 can detect the processing over-budget condition based on feedback information 250 from rendering a previous frame, one or more feed-forward predictions for rendering the current frame, etc. In one example, frame rendering component 144 can provide feedback information 250 to parameter modifying component 142, such as but not limited to one or more of a time used in rendering a previous frame, an amount of time or percentage over-budget in rendering the previous frame, and/or the like. For example, the percentage over-budget may be computed as a (budget time for rendering—actual time for rendering)/budget time for rendering. For example, for a 16 ms frame where rendering actually takes 20 ms, this may indicate an over-budget condition of: (20−16)/16=25% over-budget. This value, or the total processing time (20 ms), difference in actual and budgeted time (4 ms), etc., can be provided to the parameter modifying component 142, and the parameter modifying component 142 can accordingly detect the processing over-budget condition based on this value, either based solely on the value or based on comparing the received value to a threshold (e.g., as being greater than 0% or some other threshold), etc.

Thus, for example, detecting the processing over-budget condition at 402 may optionally include, at action 404, detecting the processing over-budget condition based at least in part on previous rendering performance. In an example, parameter modifying component 142, e.g., in conjunction with processor 104, memory 106, multiple layer rendering component 140, etc., can detect the processing over-budget condition based at least in part on previous rendering performance, which may be identified based on feedback information 250. For example, parameter modifying component 142 may detect the over-budget condition based on a received value of processing of rendering a previous frame (e.g., percentage or time over budget, as described above), or on determining that the received value achieves a threshold. In another example, parameter modifying component 142 can detect the processing over-budget condition based on an average of multiple values of feedback information 250 (e.g., multiple over-budget processing percentages over time), such as a moving average over a previous number of frames or a region of frames, etc.

In another example, detecting the processing over-budget condition may be based on receiving or generating one or more feed-forward parameters of the rendering, such as a resolution for a number of layers, a sampling density for the number of layers, etc. In one example, these parameters can be analyzed or predicted along with historical system performance parameters, system specifications, resources being used for other processes, or otherwise, in determining whether processing of rendering the frame is expected to exceed the processing budget (and/or a percentage or other extent to which the over-budget condition is expected). In an example, the application 110 and/or operating system 108 may predict the processing budget, in this regard, and indicate corresponding parameters to the parameter modifying component 142.

In method 400, at action 406, at least one of a value of a rendering parameter for a layer or a second value of the rendering parameter for a second layer can be modified based on detecting the processing over-budget condition. In an example, parameter modifying component 142, e.g., in conjunction with processor 104, memory 106, multiple layer rendering component 140, etc., can modify, based on detecting the processing over-budget condition, at least one of the value of the rendering parameter for the layer or the second value of the rendering parameter for the second layer. In this regard, for example, the value of the rendering parameter for at least one layer can be modified (e.g., reduced) in an attempt to render a current frame within the processing budget, which can allow for prioritizing layers for using rendering resources to achieve different rendering qualities in an attempt to meet the processing budget (e.g., rather than reducing quality of all layers to a similar extent).

For example, modifying the value of the rendering parameter for the (first) layer or the second value of the rendering parameter for the second layer at 406 may optionally include, at action 408, modifying the value of the rendering parameter of the (first) layer according to a first modification value. In an example, parameter modifying component 142, e.g., in conjunction with processor 104, memory 106, multiple layer rendering component 140, etc., can modify the value of the rendering parameter of the (first) layer according to the first modification value. For example, parameter modifying component 142 can change (e.g., reduce) the value for the (first) layer, and not necessarily change (e.g., reduce) the second value for the second layer, or may otherwise separately change (e.g., reduce) the second value for the second layer in an attempt to remain within the processing budget in rendering the layers of the frame. In one example, parameter modifying component 142 may determine the first amount or rate of change (e.g., reduction) of the (first) layer based on the priority profile corresponding to the layer (e.g., layer 1 priority profile 212 corresponding to layer 1 202).

In addition, for example, modifying the value of the rendering parameter for the (first) layer or the second value of the rendering parameter for the second layer at 406 may optionally include, at action 410, modifying the second value of the rendering parameter for the second layer according to a second modification value. In an example, parameter modifying component 142, e.g., in conjunction with processor 104, memory 106, multiple layer rendering component 140, etc., can modify the second value of the rendering parameter for the second layer according to the second modification value. For example, parameter modifying component 142 can change (e.g., reduce) the second value for the second layer, and not necessarily the first value for the layer, or may otherwise separately and independently (e.g., by a different amount/rate) change (e.g., reduce) the first value for the (first) layer in an attempt to remain within the processing budget in rendering the layers of the frame. In one example, parameter modifying component 142 may determine the second rate of change (e.g., reduction) of the second value of the rendering parameter for the second layer based on the priority profile corresponding to the second layer (e.g., layer 2 priority profile 214 corresponding to layer 2 204). Moreover, as described, the first amount/rate of reduction of the first value of the rendering parameter associated with the (first) layer and the second amount/rate of reduction of the second value of the rendering parameter for the second layer may be different for given values of processing over-budget (or other processing parameters, as described).

In another example, modifying the value of the rendering parameter for the (first) layer or the second value of the rendering parameter for the second layer at 406 may optionally include, at action 412, determining at least one of the first modification value based on a first priority profile or the second modification value based on a second priority profile. In an example, parameter modifying component 142, e.g., in conjunction with processor 104, memory 106, multiple layer rendering component 140, etc., can determine at least one of the first modification value of the rendering parameter for the (first) layer based on the first priority profile or the second modification value of the rendering parameter for the second layer based on the second priority profile. As described, the priority profiles 212, 214, 216 may indicate different modification value for corresponding values 222, 224 of the rendering parameter, and the values and/or corresponding rates of reduction may be determined as a function of the processing over-budget determined as part of detecting the processing over-budget condition (e.g., based on feedback from the previous frame, feed-forward as predicted for the current frame, etc., as described). As described, the appropriate modification value can be determined from the priority profiles 212, 214, 216 (e.g., based on a mapping specified in the profiles, a function specified in the profiles, etc. for the processing budget parameter) and applied to the rendering parameter for rendering the associated layer 202, 204, 206.

In one example, where the rendering parameter is a value of resolution, parameter modifying component 142 may change a viewport based on a determined resolution (e.g., from 1080 lines to 720 lines) for the over-budget condition to render the corresponding layer. Additionally, in an example, parameter modifying component 142 may scale the rendering parameter back to the configured parameter for a next frame (and may subsequently modify that value based on processing performing in rendering the current frame), or may modify the parameter to increase rendering quality for a next frame based on the processing performing in rendering the current frame. Additionally, as described for example, the rendering parameter may additionally or alternatively relate to setting a vertex level of detail in sampling meshes, activating or deactivating, or setting a level of, MSAA or anisotropic filtering, etc.

In method 400, at action 414, the layer can be rendered based at least in part on the value of the rendering parameter and the second layer can be rendered based at least in part on the second value of the rendering parameter. In an example, frame rendering component 144, e.g., in conjunction with processor 104, memory 106, multiple layer rendering component 140, etc., can render the layer based at least in part on the value of the rendering parameter and the second layer based at least in part on the second value of the rendering parameter. For example, frame rendering component 144 can send rendering instructions to the GPU 114 based on the values for the rendering parameter(s) corresponding to the layers to render the (first) layer (e.g., rendered layer 232) and second layer (e.g., rendered layer 234) in the frame 230.

In method 400, optionally at action 416, feedback of the rendering performance can be provided for subsequent rendering of the layers. In an example, frame rendering component 144, e.g., in conjunction with processor 104, memory 106, multiple layer rendering component 140, etc., can provide the feedback of the rendering performance (e.g., to parameter modifying component 142) for subsequent rendering of the layers. For example, the feedback may be feedback information 250 that indicates one or more of a percentage over processing budget, a time over processing budget, etc. for the rendering. In another example, the feedback information 250 can relate to whether the processing budget is achieved, whether rendering parameter values can be increased and remain within processing budget, etc. In this example, parameter modifying component 142 can utilize the feedback information 250 to detect the processing over-budget condition or otherwise modify the values of the rendering parameter(s), as described above.

Figure 5:
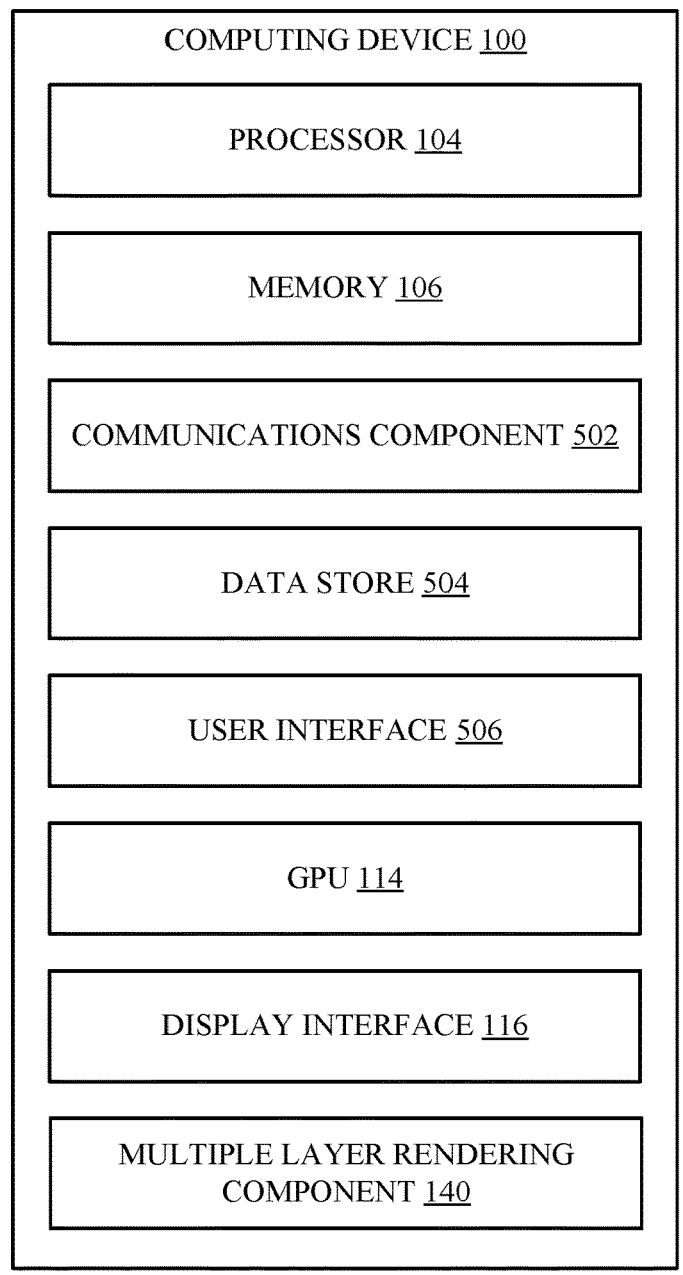
FIG. 5 is a schematic diagram of an example of a computing device for performing functions described herein.

FIG. 5 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, display drivers, etc., as described herein, and/or other components of the computing device 100.

Further, computing device 100 may include a communications component 502 that provides for establishing and maintaining communications with one or more other devices, parties, entities, etc. utilizing hardware, software, and services as described herein. Communications component 502 may carry communications between components on computing device 100, as well as between computing device 100 and external devices, such as devices located across a communications network and/or devices serially or locally connected to computing device 100. For example, communications component 502 may include one or more buses, and may further include transmit chain components and receive chain components associated with a wireless or wired transmitter and receiver, respectively, operable for interfacing with external devices.

Additionally, computing device 100 may include a data store 504, which can be any suitable combination of hardware and/or software, that provides for mass storage of information, databases, and programs employed in connection with examples described herein. For example, data store 504 may be or may include a data repository for applications and/or related parameters not currently being executed by processor 104. In addition, data store 504 may be a data repository for an operating system, application, display driver, etc. executing on the processor 104, and/or one or more other components of the computing device 100.

Computing device 100 may also include a user interface component 506 operable to receive inputs from a user of computing device 100 and further operable to generate outputs for presentation to the user (e.g., via display interface 116 to a display device). User interface component 506 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 506 may include one or more output devices, including but not limited to a display interface 116, a speaker, a haptic feedback mechanism, a printer, any other mechanism capable of presenting an output to a user, or any combination thereof.

Computing device 100 can also include a GPU 114, as described herein, for rendering frames based on rendering instruction received from processor 104. GPU 114 can additional send signals via a display interface 116 to cause display of the rendered frames on a display device. Additionally, computing device 100 may include a multiple layer rendering component 140, as described herein, to render multiple layers based on different rendering parameter values to achieve a processing budget.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for rendering graphics in a computing device, comprising:

detecting a processing over-budget condition related to rendering a frame;

determining, based on a first profile that maps values of an over-budget parameter to first modification values for a rendering parameter specific to a layer, a first modification value for the rendering parameter for rendering the layer based on the over-budget condition, wherein the layer is one of multiple layers to render for the frame;

determining, based on second profile that maps values of the over-budget parameter to second modification values for a second rendering parameter specific to a second layer, a second modification value for the second rendering parameter for rendering the second layer based on the over-budget condition, wherein the second layer is another one of the multiple layers to render for the frame, and wherein determining the second modification value is performed independently of the determining the first modification value;

modifying, based on detecting the processing over-budget condition, a value of the rendering parameter based on the first modification value;

modifying, based on detecting the processing over-budget condition, a value of the second rendering parameter based on the second modification value;

rendering the layer based at least in part on modifying the value of the rendering parameter; and rendering the second layer based at least in part on modifying the second value of the second rendering parameter.

2. The method of claim 1, wherein the first modification value is different from the second modification value.

3. The method of claim 1, wherein at least the first profile indicates different modification values, in the first modification values, for different values of the over-budget parameter.

4. The method of claim 1, further comprising:
receiving feedback from rendering a previous frame; and
wherein detecting the processing over-budget condition is based at least in part on the feedback.

5. The method of claim 1, wherein the rendering parameter is a resolution for the layer.

6. The method of claim 1, wherein the rendering parameter is one or more of an anti-aliasing parameter, a sampling rate for sampling pixels for the layer, or an anisotropic filtering parameter.

7. The method of claim 1, further comprising:
receiving feedback indicating a rendering performance based on modifying the value of the rendering parameter for the layer in rendering a previous frame; and
wherein modifying the value of the rendering parameter for the layer is further based at least in part on the feedback.

8. A computing device for rendering graphics, comprising:
a memory storing one or more parameters or instructions for executing an operating system and one or more applications;
a display interface coupled with a display device for communicating signals to display rendered frames on the display device; and
at least one processor coupled to the memory and the display interface, wherein the at least one processor is configured to:
detect a processing over-budget condition related to rendering a frame;
determine, based on a first profile that maps values of an over-budget parameter to first modification values for a rendering parameter specific to a layer, a first modification value for the rendering parameter for rendering the layer based on the over-budget condition, wherein the layer is one of multiple layers to render for the frame;
determine, based on second profile that maps values of the over-budget parameter to second modification values for a second rendering parameter specific to a second layer, a second modification value for the second rendering parameter for rendering the second layer based on the over-budget condition, wherein the second layer is another one of the multiple layers to render for the frame, and wherein the at least one processor is configured to determine the second modification value independently of determining the first modification value;
modify, based on detecting the processing over-budget condition, a value of the rendering parameter based on the first modification value;
modify, based on detecting the processing over-budget condition, a value of the second rendering parameter based on the second modification value;
render the layer based at least in part on modifying the value of the rendering parameter; and
render the second layer based at least in part on modifying the second value of the second rendering parameter.

9. The computing device of claim 8, wherein the first modification value is different from the second modification value.

10. The computing device of claim 8, wherein at least the first profile indicates different modification values, in the first modification values, for different values of the over-budget parameter.

11. The computing device of claim 8, wherein the at least one processor is configured to detect the processing over-budget condition based at least in part on feedback from rendering a previous frame.

12. The computing device of claim 8, wherein the rendering parameter is a resolution for the layer.

13. The computing device of claim 8, wherein the rendering parameter is one or more of an anti-aliasing parameter, a sampling rate for sampling pixels for the layer, or an anisotropic filtering parameter.

14. The computing device of claim 8, wherein the at least one processor is configured to modify the value of the rendering parameter for the layer further based at least in part on received feedback indicating a rendering performance based on modifying the value of the rendering parameter for the layer in rendering a previous frame.

15. A non-transitory computer-readable medium, comprising code executable by one or more processors for rendering graphics in a computing device, the code comprising code for:
detecting a processing over-budget condition related to rendering a frame;
determining, based on a first profile that maps values of an over-budget parameter to first modification values for a rendering parameter specific to a layer, a first modification value for the rendering parameter for rendering the layer based on the over-budget condition, wherein the layer is one of multiple layers to render for the frame;
determining, based on second profile that maps values of the over-budget parameter to second modification values for a second rendering parameter specific to a second layer, a second modification value for the second rendering parameter for rendering the second layer based on the over-budget condition, wherein the second layer is another one of the multiple layers to render for the frame, and wherein code for determining the second modification value determines the second modification value independently of the code for determining the first modification value;
modifying, based on detecting the processing over-budget condition, a value of the rendering parameter based on the first modification value;
modifying, based on detecting the processing over-budget condition, a value of the second rendering parameter based on the second modification value;
rendering the layer based at least in part on modifying the value of the rendering parameter; and
rendering the second layer based at least in part on modifying the second value of the second rendering parameter.

16. The non-transitory computer-readable medium of claim 15, wherein the first modification value is different from the second modification value.

17. The non-transitory computer-readable medium of claim 15, wherein at least the first profile indicates different modification values, in the first modification values, for different values of the over-budget parameter.

18. The non-transitory computer-readable medium of claim 15, further comprising code for:
receiving feedback from rendering a previous frame; and wherein the code for detecting detects the processing over-budget condition based at least in part on the feedback.

19. The non-transitory computer-readable medium of claim 15, wherein the rendering parameter is a resolution for the layer.

20. The non-transitory computer-readable medium of claim 15, wherein the rendering parameter is one or more of an anti-aliasing parameter, a sampling rate for sampling pixels for the layer, or an anisotropic filtering parameter.

\* \* \* \* \*